(12) United States Patent
Riggs et al.

(10) Patent No.: US 7,769,829 B1
(45) Date of Patent: Aug. 3, 2010

(54) MEDIA FEEDS AND PLAYBACK OF CONTENT

(75) Inventors: Brian Riggs, San Francisco, CA (US); Vijay S. Ghaskadvi, San Jose, CA (US); Joel Huff, San Francisco, CA (US)

(73) Assignee: Adobe Systems Inc., San Jose, CA (US)

( * ) Notice: Subject to any disclaimer, the term of this patent is extended or adjusted under 35 U.S.C. 154(b) by 309 days.

(21) Appl. No.: 11/879,347

(22) Filed: Jul. 17, 2007

(51) Int. Cl.
*G06F 15/16* (2006.01)
*G06F 13/00* (2006.01)

(52) U.S. Cl. .......................... 709/219; 709/231; 725/54; 725/116; 725/117

(58) Field of Classification Search .................. 709/219, 709/231
See application file for complete search history.

(56) References Cited

U.S. PATENT DOCUMENTS

| | | | |
|---|---|---|---|
| 7,343,384 B2 * | 3/2008 | Plastina et al. ............ | 707/104.1 |
| 2006/0129907 A1 * | 6/2006 | Volk et al. .................. | 715/500 |
| 2006/0129916 A1 * | 6/2006 | Volk et al. .................. | 715/513 |
| 2006/0129917 A1 * | 6/2006 | Volk et al. .................. | 715/513 |
| 2007/0078904 A1 * | 4/2007 | Yoon et al. .................. | 707/200 |
| 2007/0100629 A1 * | 5/2007 | Bodin et al. ................ | 704/261 |
| 2007/0101313 A1 * | 5/2007 | Bodin et al. ................ | 717/114 |
| 2007/0213857 A1 * | 9/2007 | Bodin et al. ................ | 700/94 |
| 2008/0046948 A1 * | 2/2008 | Verosub ...................... | 725/117 |

OTHER PUBLICATIONS http://en.wikipedia.org/wiki/Rss, "RSS", downloaded Jul. 17, 2007, pp. 1-9.
http://web.archive.org/web/20001208063100/http://my.netscape.com/publish/help/quickstart.html, "Quick Start", downloaded Jul. 17, 2007, pp. 1-6.
Dan Libby, http://we.archive.org/web/20001204093600/http://my.netscape.com/publish/formats/rss-spec-0.91.html, "RSS 0.91 Spec, revision 3", downloaded Jul. 17, 2007, pp. 1-20.
http://web.resource.org/rss/1.0/spec, "RDF Site Summary (RSS) 1.0", downloaded Jul. 17, 2007, pp. 1-15.
Internet Technology hosted by Berkman Center, http://cyber.law.harvard.edu/rss/rss.html, "RSS 2.0 at Harvard Law, RSS 2.0 Specification", downloaded Jul. 17, 2007, pp. 1-6.
RSS Advisory Board, http://rssboard.org/rss-specification, "Really Simple Specifications, tutorials and discussion, RSS 2.0 Specification", downloaded Jul. 17, 2007, pp. 1-7.
J. Ozzie, et al., http://msdn2.microsoft.com/en-us/xml/bb190613.aspx, "Simple Sharing Extensions for RSS and OPML", downloaded July 17, 2007, pp. 1-8.

* cited by examiner

*Primary Examiner*—Wing F Chan
*Assistant Examiner*—David Yi
(74) *Attorney, Agent, or Firm*—Chapin IP Law, LLC (57) ABSTRACT

Example configurations herein include a media manager associated with a media player that monitors a media feed for available content. Based on monitoring the media feed (e.g., Really Simple Syndication "RSS" feed), the media manager can receive a pointer to a content playback file. According to one configuration, the content playback file specifies retrievable content (e.g., as specified by pointers therein) and includes instructions indicating how to play back the retrievable content. Upon execution of the content playback file, the media player initiates retrieval of the content as specified by pointers in the content playback file. The media player can initiate playback of the retrieved content in accordance with markup language type playback instructions as specified by the content playback file.

21 Claims, 7 Drawing Sheets

MEDIA FEEDS AND PLAYBACK OF CONTENT

BACKGROUND

Conventional methods for obtaining information over the Internet include visiting a website (e.g., via a web browser) to view and interact with the data provided by a server hosting that website. Typically, a website includes retrievable web pages encoded according to a markup language such as HTML (e.g., Hypertext Markup Language). As well known, a browser retrieves a web page and displays it for viewing by a respective user.

In addition to HTML, the SMIL (Synchronized Multimedia Integration Language) has been developed and recommended as a way for enabling on-line multimedia presentations. In general, it defines markup for timing, layout, animations, visual transitions, and media embedding, among other things. Some of the things that SMIL is used for are to create slide-show presentations and the SMIL technology has the ability to display multiple file types like text, video, and audio.

Examples of SMIL standards include SMIL version 1.0, SMIL version 2.0, and SMIL version 2.1. At the time of this writing, SMIL version 3.0 was being developed.

One conventional method for obtaining information over the Internet includes use of so-called media feeds (e.g., web feeds such as Really Simple Syndication "RSS"). Examples of RSS standards include: RSS 2.0, RSS 1.0, RSS 0.90, and RSS 0.91.

A conventional media feed such as an RSS media feed is a proactive data distribution system for serving users (e.g., subscribers of the media feed) frequently updated raw data content. Via use of a conventional media feed, a user/subscriber of the media feed passively receives updated content and/or notification information supplied by the media feed. Content distributors (e.g., publishers) can syndicate a media feed, thereby allowing users to subscribe to it. Subscribers may aggregate media feeds by making multiple media feeds available from one location (e.g., a subscriber's home computer).

According to conventional media feeds, a content provider publishes a feed link on their site (or via another syndicate server) so that users/subscribers can register using an aggregator program (also called a feed reader or a news reader) that executes on the users' computers. When instructed, the aggregator program queries each of the servers in a media feed list (e.g., the compilation of media feeds to which the user has subscribed) for new or updated content that may be available. Consequently, if the servers indicate that new content is available, the aggregator program either makes a note of the new content and alerts the user/subscriber, or the aggregator program automatically downloads the updated content (e.g., the downloaded content from a media feed is also commonly referred to as an enclosure).

In this manner, aggregator programs can be scheduled to periodically check the servers in the media feed list for newly available content. Additionally, as discussed above, a media feed can be used to notify the subscribers of new or updated content when such content becomes available.

SUMMARY

Conventional media feed applications suffer from a variety of drawbacks. In particular, one such drawback involves the type and/or format of media content that a subscriber can download as part of a media feed configuration. In conventional media feed technology, the downloadable content as referenced by an enclosure includes only a pointer to actual raw, playable content (e.g., documents, audio files, video files, etc.) for playback by the user/subscriber of the media feed. In other words, via a conventional media feed, a user can receive a URL (Uniform Resource Locator) to raw media player content available over the Internet. A media player retrieves and executes the raw media player data. Accordingly, the publisher must process and appropriately format content for storage prior to the media player accessing and playing back the content.

Embodiments disclosed herein can significantly overcome such drawbacks and/or other drawbacks in the prior art. For example, embodiments herein provide flexibility based on use of a novel approach to enabling playback of content. According to one configuration, an aggregator can monitor a media feed to receive notification of newly available content playback files or playlists. A content playback file can include: a) one or more references or pointers to the actual raw, playable media content, and b) instructions for playback of the media content as specified by the pointers. Depending on the embodiment, the aggregator can also monitor a media feed to receive notification of URLs to newly available raw content files for playback by the media player.

According to general embodiments, an aggregator associated with a media player monitors a media feed for updates to available content. Based on monitoring the media feed (e.g., Really Simple Syndication "RSS" feed) for available content, the media manager can receive a pointer to a content playback file. According to one configuration, the content playback file specifies retrievable content (e.g., as specified by pointers therein) and instructions indicating how to play back the retrievable content. Upon execution of the content playback file, the media player initiates retrieval of the content as specified by pointers in the content playback file. The media player initiates playback of the retrieved content in accordance with instructions (e.g., markup language instructions) as specified by the content playback file.

More specifically, in the context of one embodiment, assume that a publisher of content continually updates the latest content information by uploading various media content (e.g., articles, hyperlinks, video clips, audio clips, etc.) and notifications to one or more hosting servers. Traditionally, users of a news website had to occasionally and manually visit the website (e.g., via a web browser subscription to media feeds) to attain the latest news information by proactively navigating their web browser to view the particular news website. Via subscription to and use of media feeds, embodiments herein enable a subscriber to be apprised of updates associated with content such as available playlists. For example, the latest content that has been updated and/or made available by the publisher can be automatically transmitted (or fed) to the users/subscribers over the media feed such that the users/subscribers can passively receive new or updated media content.

Thus, according to one embodiment herein, a media player (or corresponding media manager associated with the media player) monitors a media feed for available content. Based on monitoring of the media feed (e.g., via a Really Simple Syndication "RSS" feed), the media player or associated function such as a media manager can receive notification of a pointer to an updated content playback file. As mentioned above, the content playback file can specify retrievable content (e.g., as specified by pointers therein) and a set of corresponding instructions indicating how to play back the retrievable content.

Upon retrieval and execution of the content playback file, the media player initiates retrieval of the content as specified by pointers in the content playback file. The media player initiates playback of the retrieved content in accordance with playback instructions in the content playback file or instructions as referenced by the content playback file.

In one embodiment, the content playback file can be created based on use of a markup language such as XML (eXtensible Markup Language), SMIL (Synchronous Media Instruction Language), etc. Tags in the content playback file can specify how to initiate playback of content. When configured according to a markup language, a corresponding media player parses the content playback file and uses the tags to identify how to play back content. For example, upon receipt of the content playback file, the media player parses the content playback file to identify references to retrievable content located over a corresponding network. As mentioned above, the media player also parses the content playback file to identify a set of instructions indicating how the retrievable content will be played back.

The tags and/or instructions in a content playback file can specify temporal directives indicating when to render the content and proximal directives indicating where the content should be rendered in a graphical user interface produced by the media player.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Accordingly, one particular embodiment of the present disclosure is directed to a computer program product that includes a computer readable medium (e.g., tangible computer readable media) having instructions stored thereon for supporting operations such as content playback. The instructions, when carried out by a processor of a respective computer, cause the processor to: i) receive a pointer to a content playback file based on monitoring a media feed specifying updates associated with available content, ii) initiate retrieval of the content playback file as specified by the pointer; and iii) initiate playback of the available content in accordance with playback instructions in the content playback file. Note that the numbering (e.g., i, ii, iii) of the above steps has been added for clarity sake, these steps need not be performed in any particular order.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

As discussed above, techniques herein are well suited for use in media feed (e.g., RSS) applications. However, it should be noted that embodiments herein are not limited to use in such applications and that the techniques discussed herein are well suited for other applications as well.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
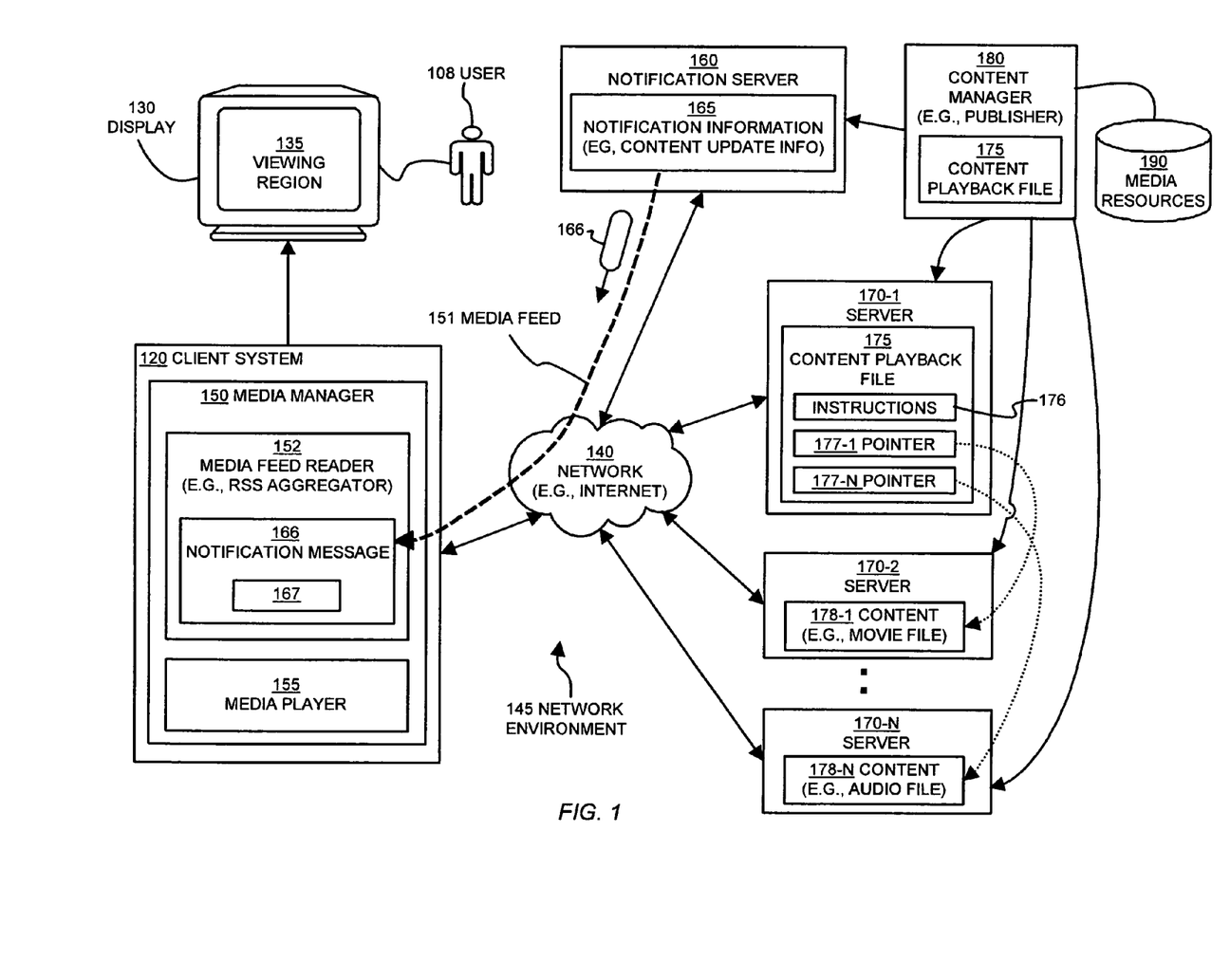
FIG. 1 is an example block diagram of a network environment illustrating use of a media feed to provide notification of newly available content according to embodiments herein.

FIG. 1 is an example block diagram of a network environment 145 supporting functions such as creation, distribution, playback, and/or management of media content according to embodiments herein.

In general, from the perspective of a content creator/publisher, FIG. 1 shows a content manager 180 that creates, publishes and/or manages content (e.g., audio, video, advertisement, etc.) for storage and distribution over a network 140. Notification of newly available content can be achieved via monitoring of a media feed 151 (e.g., Really Simple Syndication "RSS"). For example, a media manager 150 and/ or media feed reader 152 on client system 120 subscribes to and monitors the media feed 151 to receive content update information distributed by the content manager 180.

Figure 2:
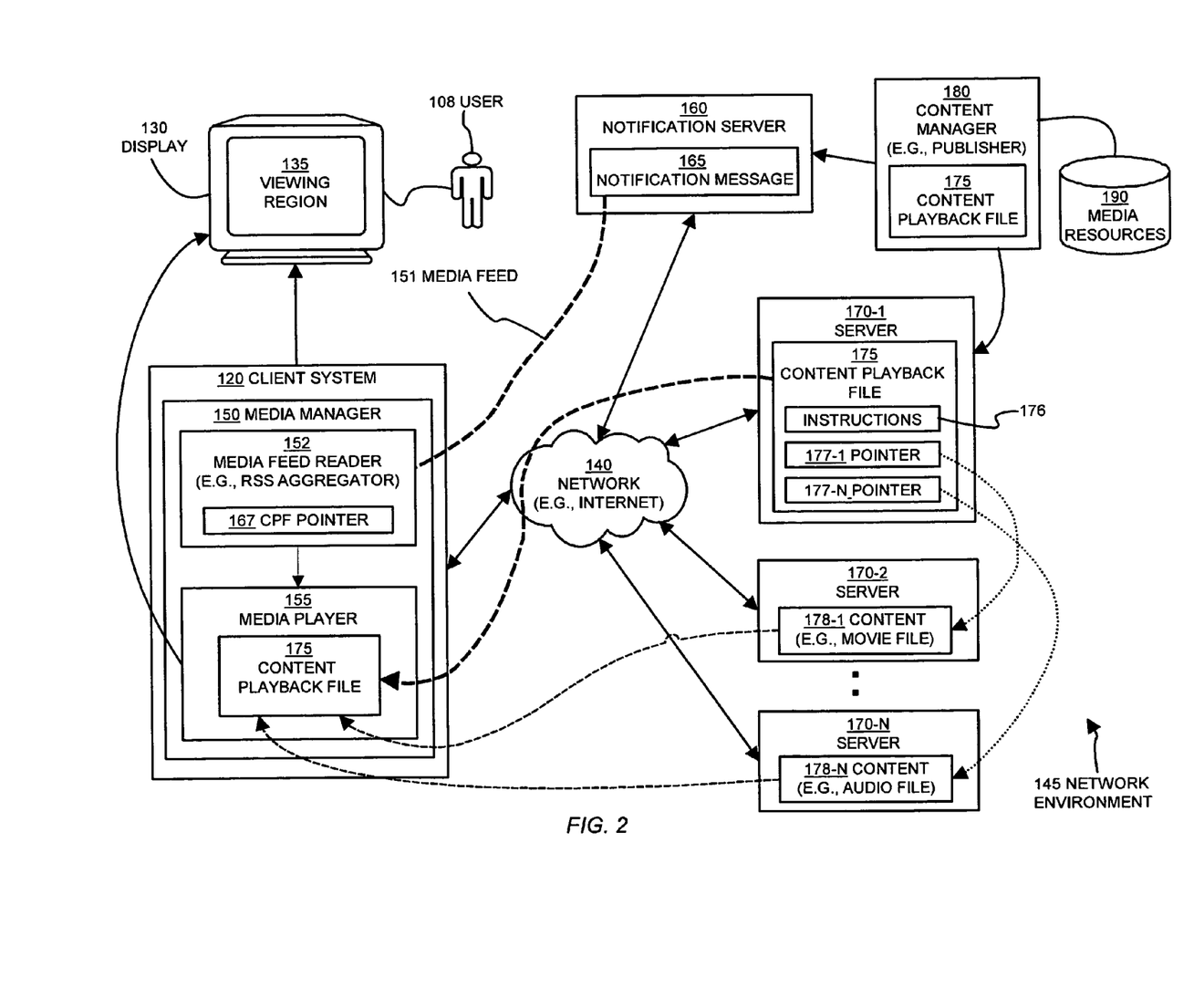
FIG. 2 is an example block diagram of a network environment illustrating retrieval and playback of content using a content playback file according to embodiments herein.

As will be discussed in more detail below, FIG. 2 depicts an example embodiment illustrating playback of content by a media feed subscriber.

Referring again to FIG. 1, the content manager 180 utilizes media resources 190 to create one or more viewing experiences for viewers to playback on their corresponding media players. In one embodiment, the content manager 180 utilizes the media resources 190 to define a viewing experience via creation of the content playback file 175. For example, the content manager 180 (e.g., a publisher) can create the content playback file 175 using a tag-based format such as eXtensible Markup Language "XML" file, Synchronous Media Instruction Language "SMIL" file, etc. The content playback file 175 includes references to portions of media resources 190 stored as content 178 on one or more servers 170. Media resources 190 can include various types of playable media such as video files, audio files, links to audio/video data, documents, etc.

More specifically, the content manager 180 produces the content playback file 175 to include pointers or links (e.g., pointer 177-1, pointer 177-N) to various media content 178 (e.g., audio clips, video clips, advertisement banners, etc.). The links enable a corresponding media player to identify where the playable content is located for purposes of retrieval. For example, the pointers 177 in a content playback file 175 can be Internet Protocol "IP" addresses, Uniform Resource Locators "URLs", etc. that point to locations where corresponding content is stored. In the context of the present example of content playback file 175, pointer 177-1 points to a location (e.g., server 170-2) where content 178-1 (e.g., an advertisement) is stored; pointer 177-N point to a location (e.g., server 170-N) where content 178-N (e.g., non-advertisement content) is stored; and so on.

Use of pointers in this way enables a publisher to dynamically create different user viewing experiences merely by changing which content pointers are included in the content playback file (e.g., an SMIL based file).

Additionally, note the content playback file 175 includes instructions (e.g., SMIL instructions or markup language instructions) specifying how to playback the media content as specified by the pointers 177 in the content playback file 175. For example, the instructions 176 can be temporal and/or proximal directives for the rendering or playback application (e.g., media player 155) with respect to the media content. These will be discussed in more detail below.

After creating the content playback file 175 defining a viewing experience as discussed above, the content manager 180 stores the content playback file 175 on one or more servers 170 as mentioned. For instance, FIG. 1 shows an example embodiment where the content manager 180 stores the content playback file 175 on server 170-1. Similarly, as shown in FIG. 1, the content manager 180 stores content 178-1 (e.g., a movie file referenced by pointer 177-1) on server 170-2 and content 178-N (e.g., an audio file referenced by pointer 177-N) on server 170-N.

It should be noted that content associated with a content playback file 175 can be located on a single server or multiple servers if so desired. Use of content pointers thus provides flexibility over storing the content in the content playback file 175.

As a possible alternative to storing playable content at one or more remote locations with respect to the content playback file 175, note that the content playback file 175 itself also can include be used to store portions of playable content.

In furtherance of the discussion above, in addition to storing the content playback file 175 on server 170-1 and storing referenced content in server 170-2 and server 170-N, the content manager 180 notifies a notification server 160 upon creating, storing, and/or updating the content playback file 175. That is, the content manager 180 provides notification that the content playback file and corresponding referenced content 178 is now available. As an example, based on communications from the content manager 180, the notification server 160 receives notification information 165 from the content manager 180 indicating that content (or corresponding content playback file 175) has been updated and is now available on server 170-1.

Note again that a subscriber such as client system 120 includes a media feed reader (e.g., an aggregator) to subscribe to media feed 151 and receive notifications of newly available content as published by content manager 180.

In one embodiment, the client system 120 includes a media manager 150. Media manager 150 includes a media feed reader 152 and media player 155. As mentioned above, the media feed reader 152 of media manager 150 enables the client system 120 to monitor media feed 151 and receive updates. Media player 155 supports playback of content (as specified by a corresponding content playback file 175) on display screen 130 for viewing by user 108.

In one example embodiment, as shown in FIG. 1, upon receiving the notification information 165, the notification server 160 transmits a notification message 166 over media feed 151 to the media manager 150 on client system 120. The notification message can be pushed or pulled from the notification server depending on a corresponding configuration.

As its name suggests, the notification message 166 informs the media feed reader 152 (e.g., RSS aggregator) that the content manager 180 has created and/or updated content related to the media feed 151 to which the user 108 has subscribed.

The notification message 166 can include a reference to the content playback file 175. For example, in one example embodiment, the notification message 166 can contain information (e.g., a pointer 167) to a location on server 170-1 where content playback file 175 is stored. Accordingly, the media player 155 and/or media feed reader 152 can retrieve the content playback file 175 if so instructed by the user 108.

In addition to the content playback file pointer 167, the notification message 165 can include metadata (associated with the content playback file) for providing relevant notification information on display screen 130 that newly updated content is available for viewing. For example, the metadata in the notification message 166 can specify what display information (e.g., image, selectable icon, symbol, descriptive text, . . . ) to display in viewing region 135 to indicate the availability of the newly updated content to the user 108. Additionally, in a specific embodiment, the notification message 166 can include a URL (e.g., pointer) to the content playback file 175. Thus, when a user clicks (e.g., selects) a symbol in viewing region 135 representing newly available content, the media player 155 (and/or media manager 150) utilizes the corresponding content playback file pointer 167 to retrieve the content playback file 175.

Accordingly, one embodiment herein includes a media feed reader 152 (e.g., an aggregator) configured to receive one or more notification messages on a corresponding media feed 151. As described herein, the notification messages inform the media feed reader 152 of updates to one or more content playback files, which are configured according to a markup language format. Accordingly, the user 108 can be apprised of content updates associated with markup language tag-based content playback files.

Note that the user 108 (e.g., subscriber) of the media feed 151 can enable filtering functionality such that certain notification messages 166 can be ignored or disregarded by the media feed reader 152. The user 108 can therefore prevent being notified of unwanted content updates. Accordingly, by configuring media feed 151, a user 108 can be apprised of only newly available content that the user 108 desires to view.

FIG. 2 is an example block diagram illustrating retrieval of a content playback file 175 and playback of corresponding content according to embodiments herein. As previously discussed, notification message 166 received via media feed 151 notifies client system 120 of newly available content, updates to content, etc.

In response to receiving the notification message 166 and corresponding content playback file pointer 167, the media feed reader 152 passes the content playback file pointer 167 contained in the notification message 166 to the media player. As previously discussed, the content playback file pointer 167 specifies a location of the content playback file 175. For example, the content playback file pointer 167 in FIG. 2 contains information (e.g., IP address, URL, file name, etc.) that the media player can utilize to retrieve the content playback file 175 from server 170-1 over network 140.

After retrieving the content playback file 175 from server 170-1 using the content playback file pointer 167, the media player 155 (e.g., as part of the media manager 150 processing) processes the content playback file for purposes of playing back corresponding content on viewing region 135 of display screen 130 for viewing by user 108. For example, the media player 155 uses pointer 177-1 in the content playback file 175 to retrieve media content 178-1 from server 170-2; the media player 155 uses pointer 177-N in the content playback file 175 to retrieve media content 178-N from server 170-N; and so on.

Alternatively, as in one example embodiment, the media feed reader 152 (e.g., RSS aggregator) retrieves the media content 178 and then subsequently provides the media content 178 to the media player 155 (e.g., via a local pointer to the media content of client system 120) for playback purposes.

Still referring to FIG. 2, upon obtaining the media content as specified by the content playback file 175, the media player 155 processes the instructions 176 in the content playback file 175 (e.g., SMIL file) in order to render the media content (e.g., video presentation) in a viewing region 135 (e.g., graphical user interface) of a display screen 130 (e.g., monitor). Thus, without having to proactively visit a website every so often to check for updated rich media content, a user 108 (e.g., subscriber of media feed 151) can passively receive such updated rich media content (e.g., content generated by a markup language file) via use of a media feed reader 152 or aggregator function as described herein.

The following text is an example of content that could be found in a content playback file 175. The following sample markup language file (e.g., content playback file 175) specifies how to playback content at a resource such as media player 155.

More specifically, the following code illustrates an example of a five-minute (duration) media episode defining a display (in viewing region 135) of three different banner advertisements (e.g., banner 1 for 100 seconds, banner 2 for 100 seconds and banner 3 for 100 seconds), three segments of video (e.g., a first advertisement of 20 seconds duration, followed by a video content of 260 seconds, followed by a second advertisement of 20 seconds), and a logo (for a duration of 300 seconds). The viewing region 135 can include three different predefined sub-regions (e.g., a banner region, a content region, and a logo region) for displaying content as further discussed below.

```
<?xml version="1.0" ?>
<smil      xmlns="http://www.w3.org/2005/SMIL21/Lan-
guage">
  <head>
    <layout>
      <region id="banner"/>
      <region id="content"/>
      <region id="logo"/>
    </layout>
  </head>
  <body>
    <par id="root">
      <seq id="Banners">
        <image  region="banner"  src="http://adserver/
          banner1.jpg" begin="100 s" dur="100 s"/>
        <image  region="banner"  src="http://adserver/
          banner2.jpg" begin="100 s" dur="100 s"/>
        <image  region="banner"  src="http://adserver/
          banner3.jpg" begin="100 s" dur="100 s"/>
      </seq>
      <seq id="VideoSequence">
        <video  id="ad1"  region="content"  src="http://ad-
          server/ad1.flv" dur="20 s"/>
        <video  id="video1"  region="content"  src="http://
          yourserver/video1.flv" dur="260 s"/>
        <video  id="ad2"  region="content"  src="http://ad-
          server/ad2.flv" dur="20 s"/>
      </seq>
      <seq id="Logo">
        <image  region="logo"  src="http://yourserver/yourl-
          ogo.jpg" dur="300 s"/>
      </seq>
    </par>
  </body>
</smil>
```

Note that the media player 155 (as well as other similarly configured media players) in network environment 145 can be pre-configured with coordinate location information defining a location for each of the banner region, the content region, and the logo region. Accordingly, when the publisher (e.g., content manager 180) creates content playback file 175, the publisher need only specify the predefined name of the predefined region to which the content shall be displayed in viewing region 135. Upon playback, the media player parsing the content playback file utilizes the region tags (e.g., banner, content or logo) to identify where to playback the content as specified in the content playback file 175.

According to additional embodiments, the media feed reader (e.g., aggregator associated with the media manager 150) can receive updates from multiple different feeds that are simultaneously monitored for newly updated or newly available content. One or more of the monitored feeds can include receiving updates associated with enclosures or retrievable media files of raw data that a respective media player can playback without having to retrieve the content via use of a pointer in the content playback file. In other words, the retrieved media file itself includes the raw data to be played back by the media player.

Use of pointers in a markup language based content playback file 175 as described herein enables a respective content manager 180 flexibility because it is easy to change either the content or the playback instructions associated with a corresponding viewing experience as defined by the content playback file. Thus, according to embodiments herein, the content manager can easily update content. The media feed reader 152 can be configured to retrieve the new content and corresponding instructions as indicated by the media feed 151 and playback the content.

The media feed reader 152 can recognize different types of enclosures based on a corresponding file extension associated with the enclosure file. For example, the content playback file according to embodiments herein can have an associated file extension type such as ".smi" or "smil." As previously discussed, such a file will be executed as discussed above. If, on the other hand, an enclosure file has an extension type of ".mp3" or ".flv", the media feed reader 152 (and/or media player) can initiate playback of such a file by retrieving a file and playing back the raw data included in the file without use of pointers and/or instructions.

Note that the content playback file 175 can be is delivered on media feed 151 as an RSS enclosure. By including both raw media content files and content playback files (e.g., markup language based instructions with pointers) in the same or over different media feeds, the content manager 180 has different options for making content available for playback by different media players.

Figure 3:
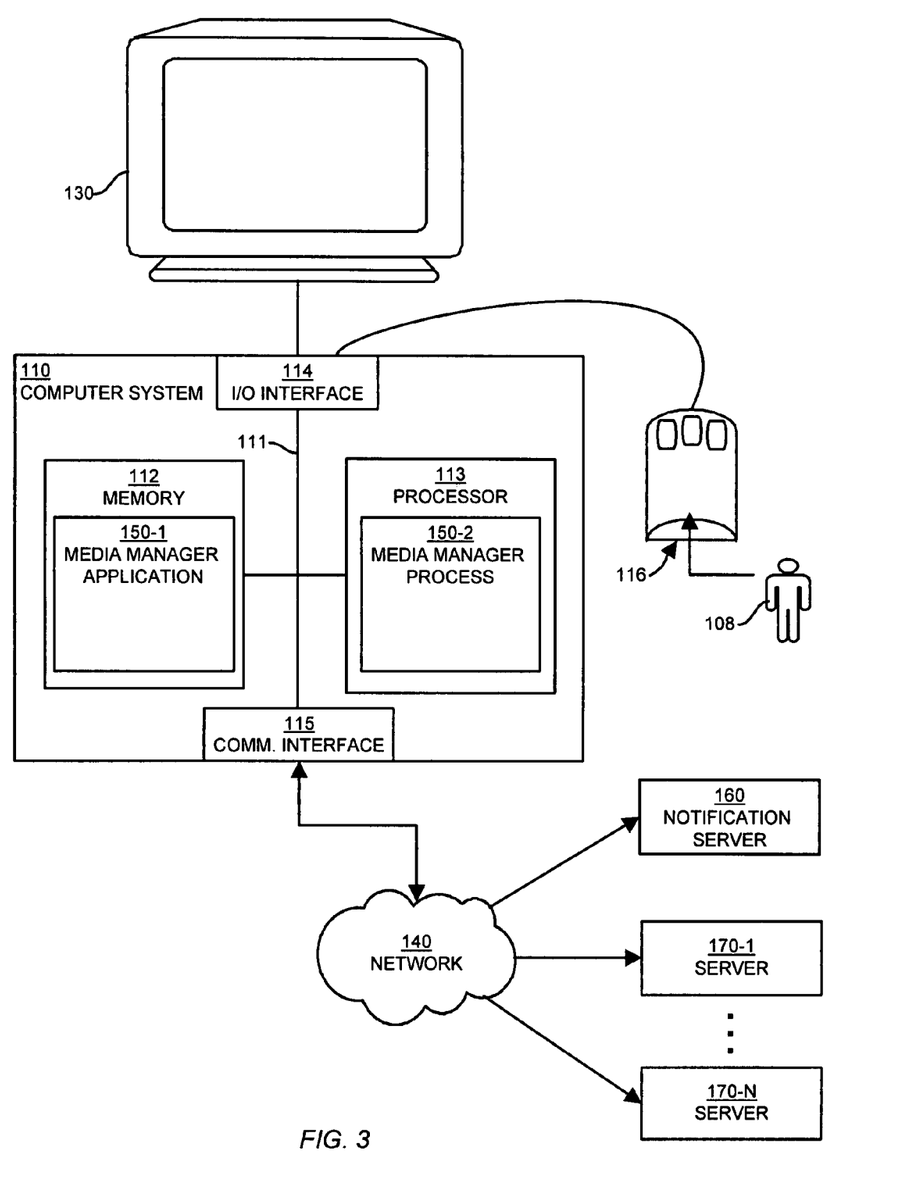
FIG. 3 is an example block diagram of a computer system configured with a media manager application and including a media manager process according to embodiments herein.

FIG. 3 is a block diagram illustrating example architecture of a computer system 110 (e.g., client system 120) that executes, runs, interprets, operates or otherwise performs a media manager application 150-1 and/or media manager process 150-2 according to embodiments herein. As previously discussed, media manager can be configured to support functionality associated with media player 155 and media feed reader 152 as well as other functionality as described herein. The computer system 110 may be any type of computerized device such as a personal computer, workstation, portable computing device, console, laptop, network terminal, client, etc.

As shown in the example of FIG. 3, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 (e.g., media feed subscriber) to provide input commands. The communications interface 115 enables the computer system 110 to communicate with other devices (e.g., other computers such as notification server 160 and servers 170) over a respective a network 140 (e.g., a LAN, the Internet, WAN, etc.).

The memory system 112 can generally be any type of computer readable media (e.g., tangible computer readable media) encoded with a media manager application 150-1. The media manager application 150-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the media manager application 150-1. Execution of media manager application 150-1 in this manner produces processing functionality in a media manager process 150-2. In other words, the media manager process 150-2 represents one or more portions of runtime instances of the media manager application 150-1 (or the entire application 150-1) performing or executing within or upon the processor 113 in the computerized device 110 at runtime.

It should be noted that the content manager 180 can be configured to operate on a computer system in a similar way as discussed above for the media manager 150. For example, the content manager can be a process and/or computer code encoded on tangible computer readable media. The content manager 180 may run and/or execute on a similar device as computer system 110.

FIGS. 4-7 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4:
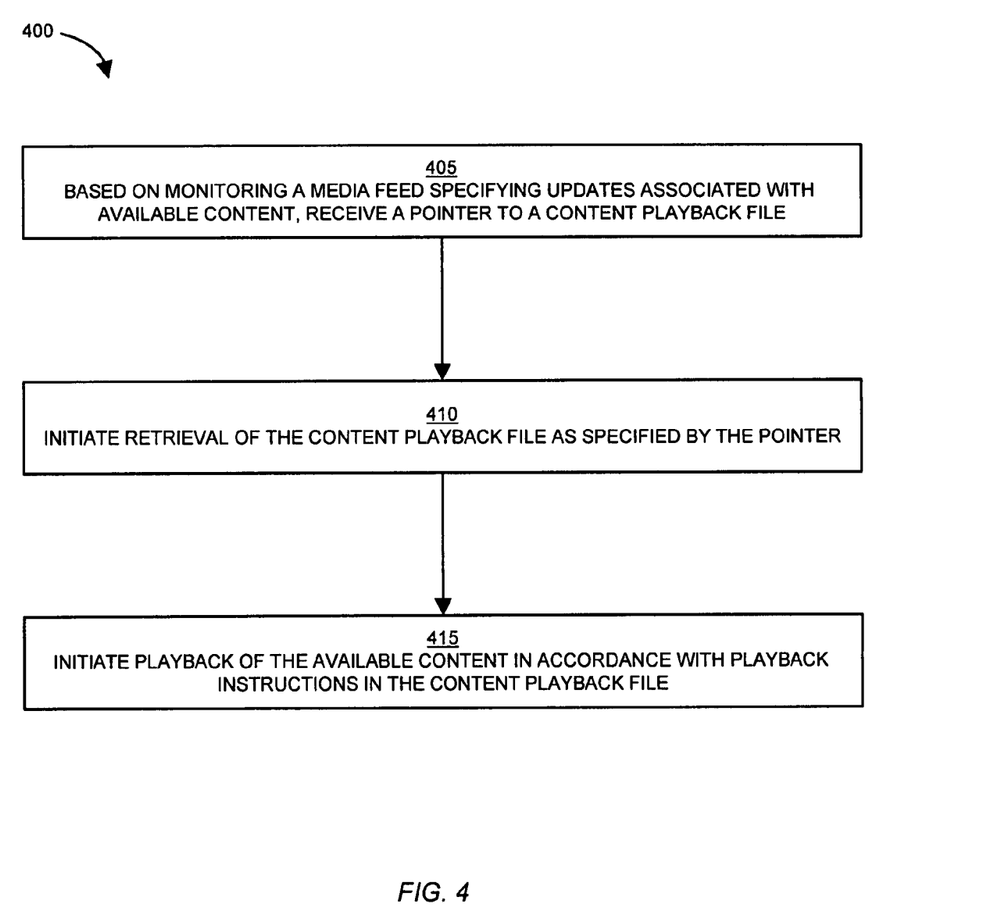
FIG. 4 is an example flowchart of processing steps associated with a client computer according to embodiments herein.

Now, more specifically, FIG. 4 is a flow chart 400 of processing steps that shows processing operations performed by the media manager 150 (or, more specifically, media feed reader 152) from the perspective of the client system 120 in accordance with one example embodiment.

In step 405, based on monitoring a media feed 151 specifying updates associated with available content (e.g., audio/video clips, news articles, etc.), the media manager 150 receives a pointer or reference (e.g., CPF pointer 167) to a content playback file 175. As shown and discussed in the example embodiments of FIGS. 1 and 2, the media feed reader 152 (e.g., as part of media manager 150) receives notification message 166 from notification server 160 across network 140 (e.g., the Internet). In this example embodiment, the notification message 166 contains location information (e.g., CPF pointer 167) for locating and retrieving the content playback file 175.

In step 410, the media manager 150 initiates retrieval of the content playback file 175 as specified by the pointer (e.g., CPF pointer 167). According to one example embodiment, the media feed reader 152 uses the CPF pointer 167 to retrieve the content playback file 175 from server 170 across network 140. As previously discussed, and as shown in FIG. 2, the media feed reader 152 can pass the CPF pointer 167 to the media player 155 so that the media player 155 can retrieve the content playback file 175 from server 170 across network 140. As an alternative, the media feed reader can utilize the content playback file pointer to retrieve the content playback file 175.

According to one example embodiment, the media manager 150 receives the content playback file 175 as a markup language (e.g., XML, SMIL, etc.) in which data in the content playback file 175 is tagged according to a markup language standard utilized by a media player application 155 to execute and playback the content playback file 175.

In another example embodiment, the media manager 150 identifies that the content playback file 175 includes the playback instructions 176 and at least one corresponding content reference pointer (e.g., pointers 177-1 . . . 177-N) to retrieve the available content based on a file extension (e.g., a SMIL file extension) associated with the content playback file 175. Typically, as in one example embodiment, the media manager 150 identifies the playback instructions 176 and corresponding reference pointers by parsing the content playback file 175, as will be discussed in more detail below.

In step 415, the media manager 150 initiates playback of the available content 178 (e.g., movie file content 178-1 and audio file content 178-N) in accordance with playback instructions 176 in the content playback file 175. For instance, in the example embodiment of FIG. 2, the media player 155 renders the playback of the content 178 (e.g., movie file content 178-1, audio file content 178-N) in the viewing region 135 (e.g., graphical user interface) of display 130.

Figure 5:
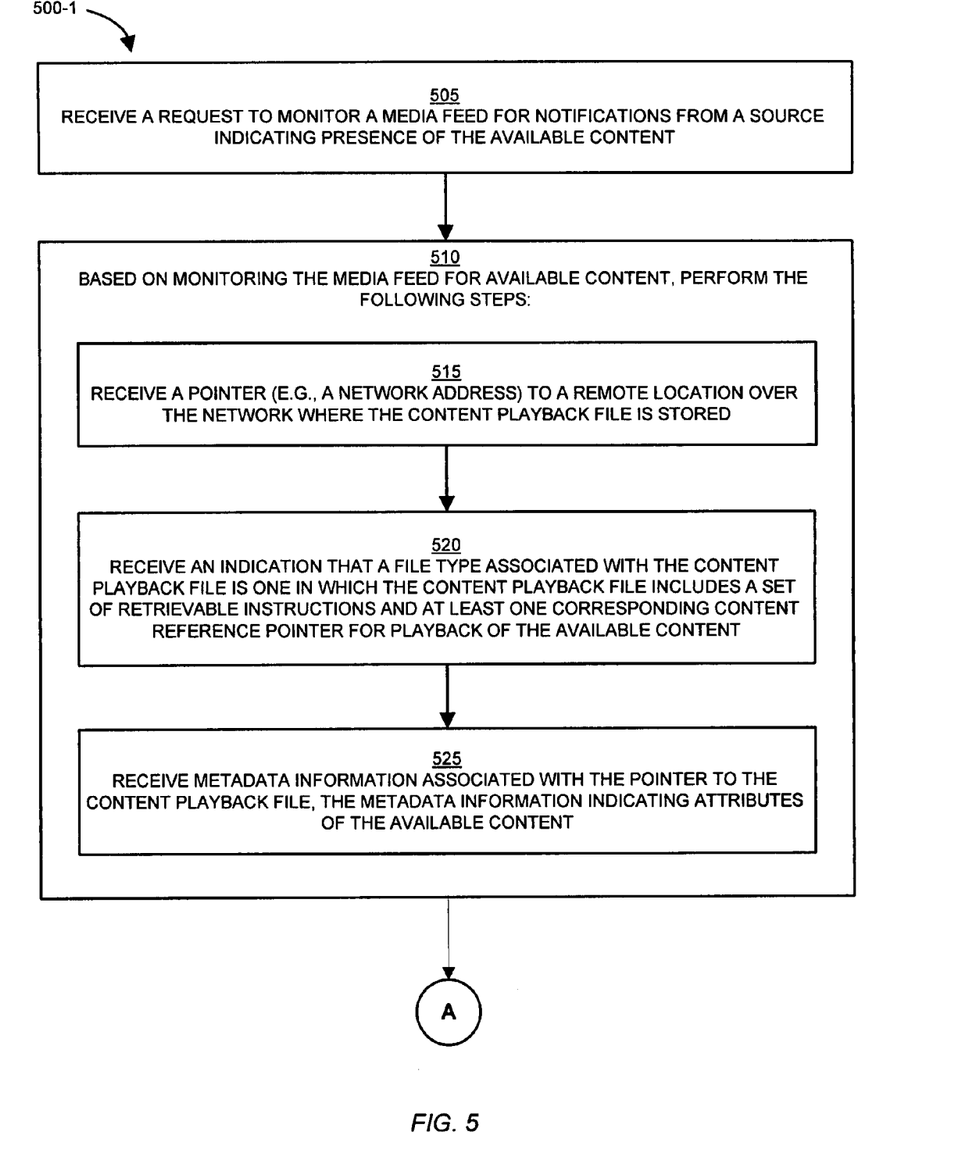
FIGS. 5 and 6 combine to form an example flowchart of processing steps associated with a client computer according to embodiments herein.

FIG. 5A is a flow chart 500-1 of processing steps that shows processing operations performed by the media manager 150 from the perspective of the media manager 150 (e.g., media player 155 or media feed reader 152) of the client system 120 (e.g., media feed subscriber) in accordance with one example embodiment.

In step 505, prior to monitoring the media feed 151, the media manager 150 receives a request to monitor the media feed 151 for notifications (e.g., notification message 166) from a source indicating the presence of the available content. In other words, the user 108 subscribes to media feed 151 by instructing the media manager 150 to respond to and/or ignore certain notification messages 166 transmitted by the notification server 160. As mentioned above, the user 108 can utilize a filtering mechanism to further tailor the user's preferences for the receipt of specific media content from media feed 151.

In step 510, based on monitoring the media feed 151 for available content, the media manager 150 performs the operations described in the steps 515, 520, and 525 below.

In step 515, the media manager 150 receives a network address (e.g., IP address, URL, etc.) to a remote location over network 140 (e.g., LAN, the Internet) where the content playback file 175 is stored. For instance, in the example embodiment of FIGS. 1 and 2, the received CPF pointer 167 contains the network address of server 170-1 so that the media manager 150 can retrieve the content playback file 175 from across network 140 (e.g., the Internet).

In step 520, the media manager 150 receives an indication of a file type associated with the content playback file 175. For example, assume that the media manager 150 receives indicate that the content playback file is of a type (e.g., a SMIL file) in which the content playback file 175 includes a set of retrievable instructions 176 and at least one corresponding content reference pointer (e.g., pointers 177) for playback of the available content 178. By discerning the file type associated with the content playback file 175 (e.g., identifying the content playback file 175 as a SMIL file), the media manager 150 can perform the appropriate processing necessary to parse the content playback file 175 in accordance with configurations described herein.

In step 525, based on monitoring the media feed 151 for available content, the media manager 150 can receive metadata information associated with the pointer (e.g., CPF pointer 167) to the content playback file 175. The metadata information can indicate attributes associated with the available content 178 such as, for example, the title of the media content, a summary of the media content, thumbnail previews of the media contain, etc. As previously discussed, the media player 155 uses such information to notify the user 108 of newly available content.

Figure 6:
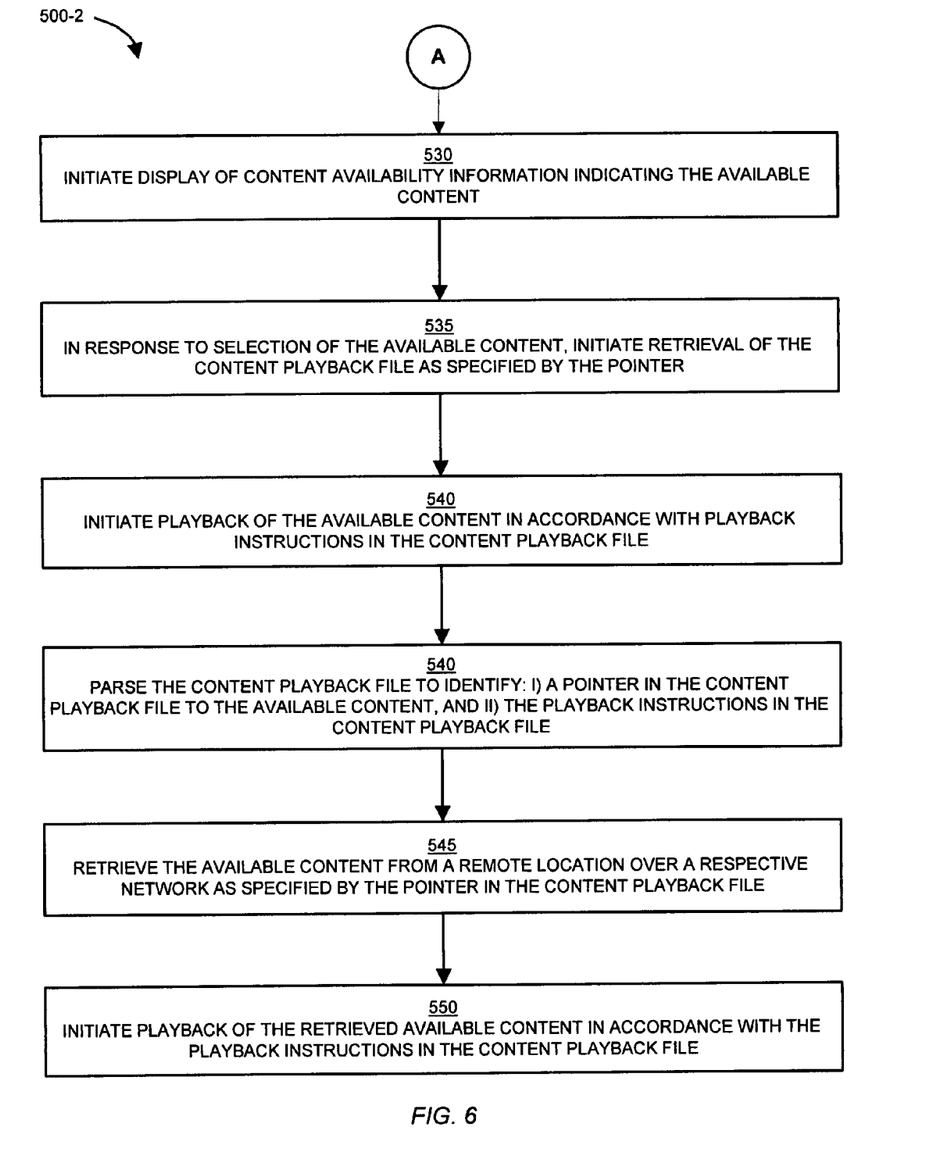

FIG. 6 is a flow chart 500-2 of processing steps that shows processing operations performed by the media manager 150 from the perspective of the client system 120 (e.g., media feed subscriber) in accordance with one example embodiment.

In step 530, the media manager 150 initiates display of content availability information in viewing region 135 of display screen 130 indicating the available content. Processing of step 530 is similar to the processing previously described with respect to step 415.

In step 535, in response to selection of the newly available content by a user 108 clicking on display screen 130, the media manager 150 initiates retrieval of the content playback file 175. In one example embodiment, in response to receiving the notification message 166 from notification server 160, the media manager 150 presents the available updated content (e.g., using information provided by the metadata) to user 108. The user 108 then instructs the media manager 150 (e.g., if interested in the updated media content) to retrieve the updated media content and, in turn, the media manager 150 initiates retrieval of the content playback file 175. In another embodiment, the user 108 has predefined preferences (e.g., receive only sports related updates) related to the content provided by the media feed 151 (e.g., via a filtering mechanism).

If, for example, the notification message 166 contains updated media content that is aligned with the user preferences (e.g., updated sports information), the media manager 150 automatically initiates retrieval of the content playback file 175 without user 108 interaction. Alternatively, if the notification message 166 contains updated media content that is not aligned with the user preferences (e.g., non-sports related content), the media manager 150 (more specifically the media feed reader 152) ignores or disregards the notification message and does not notify the use of unwanted content updates.

In step 540, the media manager 150 parses the received content playback file 175 to identify: i) a pointer (e.g., pointers 177-1 . . . 177-N) in the content playback file 175 to the available content 178, and ii) the playback instructions 176 (e.g., tags) in the content playback file 175. In one embodiment, the media feed reader 152 parses the content playback file 175 to identify and extract the instructions 176 and pointers 177. Conversely, in another example embodiment, the media player 155 parses the content playback file 175.

In step 545, the media manager 150 retrieves the available content 178 from a remote location (e.g., servers 170-2 . . . 170-N) over a respective network 140 as specified by the pointer (e.g., pointers 177-1 . . . 177-N) in the content playback file 175, as shown in the example embodiment of FIG. 2.

In step 550, the media manager 150 initiates playback of the retrieved available content 178 in accordance with the playback instructions 176 in the content playback file 175. As an example implementation, the instructions 176 may direct the media player 155 to render the video file content 178-1 before rendering the audio file content 178-N, and to render the video file content 178-1 in the upper left region of the viewing region 135 (e.g., graphical user interface), and so on.

Figure 7:
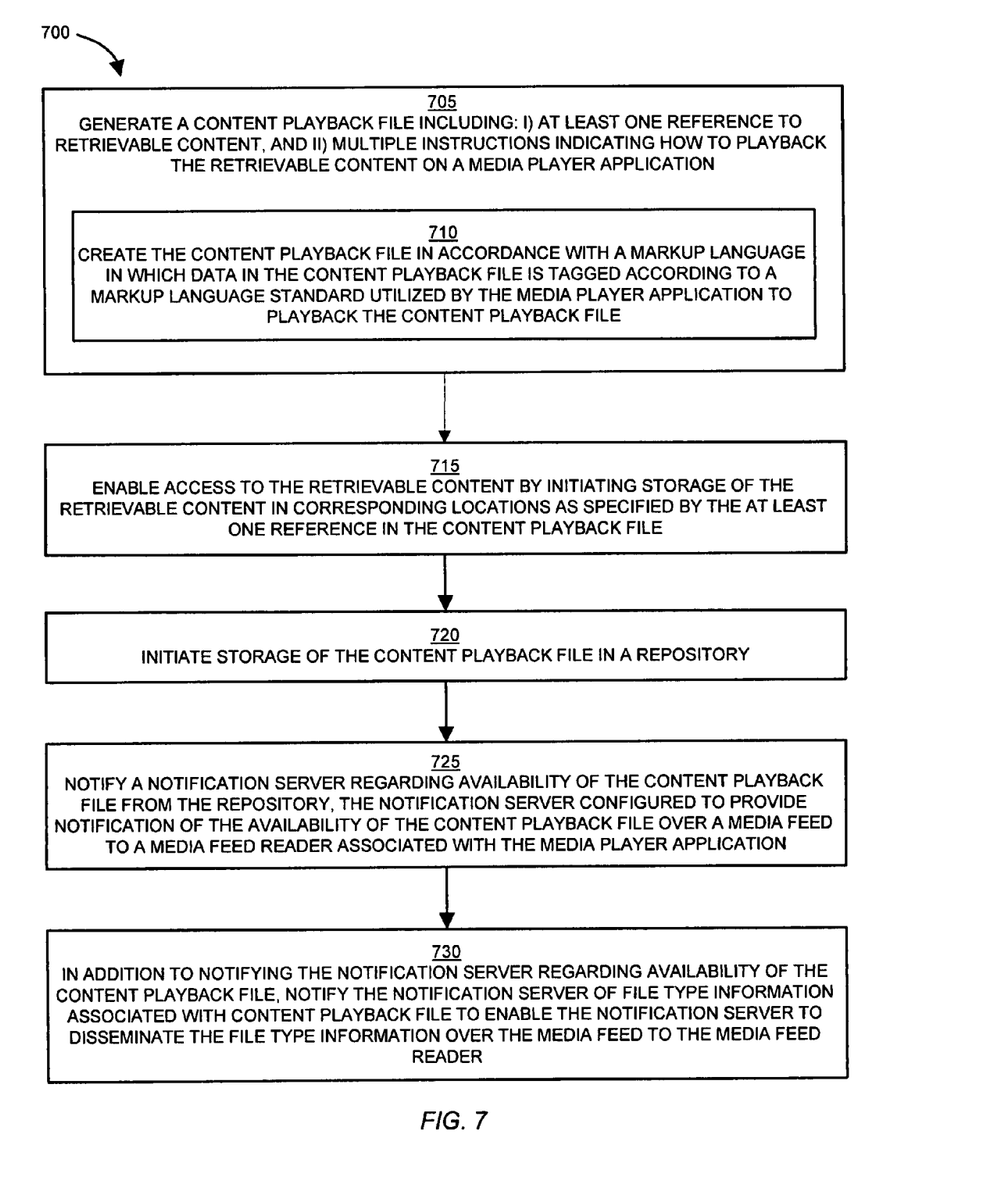
FIG. 7 is an example flowchart of processing steps performed by a content manager according to embodiments herein.

FIG. 7 is a flow chart 700 of processing steps that shows processing operations performed by the content manager 180 (e.g., media publisher and/or distributor) in accordance with example embodiments herein.

In step 705, the content manager 180 generates a content playback file 175 including: i) at least one reference (e.g., pointers 177-1 . . . 177-N) to retrievable content 178, and ii) multiple instructions 176 indicating how to playback the retrievable content on a media player application 155, as shown in the example embodiment of FIG. 1. For example, as shown in FIG. 1, the content manager 180 generates the content playback file 175 by obtaining and utilizing media content (e.g., audio files, video files, documents, pointer, hyperlinks, etc.) stored in the media resource database 190.

In step 710, the content manager 180 creates the content playback file in accordance with a markup language (e.g., XML, SMIL, etc.) in which data in the content playback file 175 is tagged according to a markup language standard utilized by the media player application 155 to playback the content playback file 175.

In step 715, the content manager 180 enables access to the retrievable content 178 by initiating storage of the retrievable content 178 in corresponding locations as specified by the pointers 177 in the content playback file 175. As shown in the example embodiment of FIG. 1, content manager 180 stores retrievable content 178-1 (e.g., movie file) on server 170-2 and retrievable content 178-N (e.g., audio file) on server 170-N. In one example embodiment, the content manager 180 stores the retrievable content on the remote servers 170 via communications over network 140 (e.g., the Internet).

In step 720, the content manager 180 initiates storage of the content playback file 175 in a repository such as server 170-1.

In step 725, the content manager 180 notifies a notification server 160 regarding availability of the content playback file 175 from the repository (e.g., server 170-1). In this manner, the notification server 160 is configured to provide notification (e.g., via notification message 166) of the availability of the content playback file 175 over a media feed 151 to a media feed reader 152 associated with the media player application 155. According to one example embodiment, the content manager 180 provides a pointer (e.g., CPF pointer 167) to the notification server 160 that references the content playback file 175 in the repository (e.g., server 170-1). As such, the notification server 160 is also configured to enable the media player 155 to access the content playback file 175 by dissemination of the pointer (e.g., CPF pointer 167) over the media feed 151 to the media feed reader 152.

In step 730, in addition to notifying the notification server 160 regarding the availability of the content playback file 175, the content manager 180 notifies the notification server 160 of file type information associated with content playback file 175 (e.g., XML or SMIL file type information) to enable the notification server 160 to disseminate the file type information over the media feed 151 to the media feed reader 152. As a consequence, by indicating the file type information to the media feed reader 152, the media feed reader 152 (e.g., RSS aggregator) can perform the appropriate processing necessary to parse the content playback file 175 once retrieved from the server 170-1.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What we claim is:

1. A computer-implemented method comprising:
   monitoring, via an RSS (Really Simple Syndication) aggregator, a media feed that is an RSS-based media feed, the media feed specifying updates associated with available content, wherein the media feed is an RSS enclosure that includes a Synchronous Media Integration Language (SMIL)-based playlist;
   based on monitoring the media feed, receiving, at the RSS aggregator via the media feed, a pointer to a content playback file;
   initiating, via the RSS aggregator, retrieval of the content playback file as specified by the pointer, including receiving the content playback file in a markup language format in which data in the content playback file is tagged according to a markup language standard used by a media player application to execute the content playback file, the content playback file referencing retrievable content and the content playback file including playback instructions that indicate how to playback the retrievable content in the media player application;
   initiating playback of the available content in accordance with the playback instructions in the content playback file;
   identifying that the content playback file includes the playback instructions and a corresponding at least one content reference pointer to retrieve the available content based on a file extension associated with the content playback file, the content playback file specifying tags referencing predefined viewing regions in which to display the available content according to tag-based instructions in the content playback file;
   wherein initiating playback of the available content in accordance with playback instructions includes:
      parsing the content playback file to identify: i) a pointer in the content playback file to the available content, and ii) the playback instructions in the content playback file;
      retrieving the available content from a remote location over a respective network as specified by the pointer in the content playback file; and
      initiating playback of the retrieved available content in accordance with the playback instructions as specified by the content playback file; wherein receiving the pointer to the content playback file additionally includes:
      receiving an indication that a file type associated with the content playback file is one in which the content playback file includes a set of retrievable instructions and at least one corresponding content reference pointer for playback of the available content.

2. The computer-implemented method as in claim 1 further comprising:
   based on monitoring the media feed for available content, receiving metadata information associated with the pointer to the content playback file, the metadata information indicating attributes of the available content.

3. The computer-implemented method as in claim 2, wherein receiving the pointer to the content playback file includes receiving a network address to a remote location over network where the content playback file is stored.

4. The computer-implemented method as in claim 1 further comprising:
   prior to monitoring the media feed, receiving a request to monitor the media feed for notifications from a source indicating presence of the available content.

5. The computer-implemented method as in claim 1 further comprising:
   based on monitoring the media feed, receiving notification of the available content;
   initiating display of content availability information indicating the available content;

in response to selection of the available content, initiating retrieval of the content playback file;

retrieving the available content from a remote location over a respective network as specified by the pointer in the content playback file; and initiating playback of the retrieved available content in accordance with the playback instructions in the content playback file.

6. A computer-implemented method comprising:

generating a content playback file including: i) at least one reference to retrievable content, and ii) multiple instructions indicating how to playback the retrievable content on a media player application;

initiating storage of the content playback file in a repository, the content playback filed stored in a markup language format in which data in the content playback file is tagged according to a markup language standard used by the media player application to execute the content playback file;

notifying a notification server regarding availability of the content playback file from the repository, the notification server configured to provide notification of the availability of the content playback file over a media feed to an RSS (Really Simple Syndication) media feed reader associated with the media player application, wherein the media feed is an RSS enclosure that includes a Synchronous Media Integration Language (SMIL)-based playlist;

wherein the content playback file includes playback instructions and a corresponding at least one content reference pointer to retrieve the retrievable content based on a file extension associated with the content playback file, the content playback file specifying tags referencing predefined viewing regions in which to display the retrievable content according to tag-based instructions in the content playback file;

wherein a file type associated with the content playback file is a file type that includes an indication in which the content playback file includes a set of retrievable instructions and at least one corresponding content reference pointer for playback of the retrievable content;

wherein generating the content playback file includes generating playback instructions for:

parsing the content playback file to identify: i) a pointer in the content playback file to the available content, and ii) the playback instructions in the content playback file;

retrieving the available content from a remote location over a respective network as specified by the pointer in the content playback file; and initiating playback of the retrieved available content in accordance with the playback instructions as specified by the content playback file.

7. The computer-implemented method as in claim 6 further comprising:

enabling access to the retrievable content by initiating storage of the retrievable content in corresponding locations as specified by the at least one reference in the content playback file.

8. The computer-implemented method as in claim 6, wherein notifying the notification server regarding availability of the content playback file includes providing the notification server a pointer pointing to the content playback file in the repository, the notification server configured to enable the media player to access the content playback file by dissemination of the pointer over the media feed to the media feed reader.

9. The computer-implemented method as in claim 8 further comprising:

in addition to notifying the notification server regarding availability of the content playback file, notifying the notification server of file type information associated with content playback file to enable the notification server to disseminate the file type information over the media feed to the media feed reader.

10. A tangible computer-readable storage medium having instructions stored thereon, the instructions, when executed by a processing device, enabling the processing device to perform operations of:

monitoring, via an RSS (Really Simple Syndication) aggregator, a media feed that is an RSS-based media feed, the media feed specifying updates associated with available content, wherein the media feed is an RSS enclosure that includes a Synchronous Media Integration Language (SMIL)-based playlist;

based on monitoring the media feed, receiving, at the RSS aggregator via the media feed, a pointer to a content playback file;

initiating, via the RSS aggregator, retrieval of the content playback file as specified by the pointer, including receiving the content playback file in a markup language format in which data in the content playback file is tagged according to a markup language standard used by a media player application to execute the content playback file, the content playback file referencing retrievable content and the content playback file including playback instructions that indicate how to playback the retrievable content in the RSS aggregator;

initiating playback of the available content in accordance with the playback instructions in the content playback file;

identifying that the content playback file includes the playback instructions and a corresponding at least one content reference pointer to retrieve the available content based on a file extension associated with the content playback file, the content playback file specifying tags referencing predefined viewing regions in which to display the available content according to tag-based instructions in the content playback file;

wherein initiating playback of the available content in accordance with playback instructions includes:

parsing the content playback file to identify: i) a pointer in the content playback file to the available content, and ii) the playback instructions in the content playback file;

retrieving the available content from a remote location over a respective network as specified by the pointer in the content playback file; and initiating playback of the retrieved available content in accordance with the playback instructions as specified by the content playback file;

wherein receiving the pointer to the content playback file additionally includes:

receiving an indication that a file type associated with the content playback file is one in which the content playback file includes a set of retrievable instructions and at least one corresponding content reference pointer for playback of the available content.

11. The tangible computer-readable storage medium as in claim 10 further encoded with instructions supporting operations of:

based on monitoring the media feed for available content, receiving metadata information associated with the pointer to the content playback file, the metadata information indicating attributes of the available content; and wherein receiving the pointer to the content playback file includes receiving a network address to a remote location over network where the content playback file is stored.

12. The tangible computer-readable storage medium as in claim 10 further encoded with instructions supporting operations of:

prior to monitoring the media feed, receiving a request to monitor the media feed for notifications from a source indicating presence of the available content.

13. The tangible computer-readable storage medium as in claim 10 further encoded with instructions supporting operations of:

based on monitoring the media feed, receiving notification of the available content;

initiating display of content availability information indicating the available content;

in response to selection of the available content, initiating retrieval of the content playback file;

retrieving the available content from a remote location over a respective network as specified by the pointer in the content playback file; and initiating playback of the retrieved available content in accordance with the playback instructions in the content playback file.

14. A computer system comprising:

a processor;

a memory unit that stores instructions associated with an application executed by the processor; and an interconnect coupling the processor and the memory unit, enabling the computer system to execute the application and perform operations of:

monitoring, via an RSS (Really Simple Syndication) aggregator, a media feed that is an RSS-based media feed, the media feed specifying updates associated with available content, wherein the media feed is an RSS enclosure that includes a Synchronous Media Integration Language (SMIL)-based playlist;

based on monitoring the media feed, receiving, at the RSS aggregator via the media feed, a pointer to a content playback file; initiating, via the RSS aggregator, retrieval of the content playback file as specified by the pointer, including receiving the content playback file in a markup language format in which data in the content playback file is tagged according to a markup language standard used by a media player application to execute the content playback file, the content playback file referencing retrievable content and the content playback file including playback instructions that indicate how to playback the retrievable content in the media player application;

initiating playback of the available content in accordance with the playback instructions in the content playback file;

identifying that the content playback file includes the playback instructions and a corresponding at least one content reference pointer to retrieve the available content based on a file extension associated with the content playback file, the content playback file specifying tags referencing predefined viewing regions in which to display the available content according to tag-based instructions in the content playback file;

wherein initiating playback of the available content in accordance with playback instructions includes:

parsing the content playback file to identify: i) a pointer in the content playback file to the available content, and ii) the playback instructions in the content playback file;

retrieving the available content from a remote location over a respective network as specified by the pointer in the content playback file; and initiating playback of the retrieved available content in accordance with the playback instructions as specified by the content playback file;

wherein receiving the pointer to the content playback file additionally includes:

receiving an indication that a file type associated with the content playback file is one in which the content playback file includes a set of retrievable instructions and at least one corresponding content reference pointer for playback of the available content.

15. The computer-implemented method of claim 1, wherein the file type associated with the content playback file is a Synchronous Media Integration Language (SMIL) file.

16. The computer-implemented method of claim 1, wherein the tags are Synchronous Media Integration Language (SMIL) tags that specify how to initiate playback of the available content, the tags specifying temporal directives indicating when to render the available content, and the tags specifying proximal directives indicating where to render the available content in a graphical user interface produced by the media player.

17. The computer-implemented method of claim 9, further comprising:

dynamically creating different user viewing experiences by changing which content pointers are included in the content playback file.

18. The computer-implemented method of claim 17, further comprising separately modifying either the retrievable content or the multiple instructions indicating how to playback the retrievable content on the media player application.

19. The computer-implemented method of claim 18, further comprising:

the media player being pre-configured with coordinate location information defining a location for a banner region, a location for a content region, and a location for a logo region;

wherein generating the content playback file includes specifying a predefined name of a region in which the retrievable content will be displayed without specifying coordinate location.

20. The computer-implemented method of claim 1, wherein the tags are Synchronous Media Integration Language (SMIL) tags that specify how to initiate playback of the available content, the tags specifying temporal directives indicating when to render the available content, and the tags specifying proximal directives indicating where to render the available content in a graphical user interface produced by the media player.

21. The computer-implemented method of claim 4, wherein tags within the content playback file are Synchronous Media Instruction Integration Language (SMIL) tags that specify how to initiate playback of the available content, the tags specifying temporal directives indicating when to render the available content, and the tags specifying proximal directives indicating where to render the available content in a graphical user interface produced by the media player.

* * * * *